US011169885B2

United States Patent
Jindal et al.

(10) Patent No.: US 11,169,885 B2
(45) Date of Patent: Nov. 9, 2021

(54) SYSTEM AND METHOD FOR RECONFIGURING CONFIGURATION PARAMETERS OF VIRTUAL OBJECTS DURING RECOVERY

(71) Applicant: Nutanix, Inc., San Jose, CA (US)

(72) Inventors: Ankush Jindal, Bangalore (IN);
Bharat Kumar Beedu, Bangalore (IN);
Pranay Ega, San Jose, CA (US);
Sudish Kumar Sah, Bangalore (IN);
Naveen Kumar, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 481 days.

(21) Appl. No.: 16/206,974

(22) Filed: Nov. 30, 2018

(65) Prior Publication Data
US 2020/0174889 A1 Jun. 4, 2020

(51) Int. Cl.
*G06F 11/14* (2006.01)
*G06F 16/11* (2019.01)
*G06F 9/455* (2018.01)
*G06F 11/34* (2006.01)

(52) U.S. Cl.
CPC ...... *G06F 11/1448* (2013.01); *G06F 9/45558* (2013.01); *G06F 11/3409* (2013.01); *G06F 11/3442* (2013.01); *G06F 16/128* (2019.01); *G06F 2009/4557* (2013.01)

(58) Field of Classification Search
CPC ............. G06F 9/45558; G06F 11/1448; G06F 11/3409; G06F 11/3442; G06F 16/128
See application file for complete search history.

(56) References Cited

U.S. PATENT DOCUMENTS

| 7,725,671 | B2 | 5/2010 | Prahlad et al. | |
|---|---|---|---|---|
| 7,840,533 | B2 | 11/2010 | Prahlad et al. | |
| 8,095,662 | B1* | 1/2012 | Lappas | G06Q 10/06 709/226 |
| 8,352,608 | B1* | 1/2013 | Keagy | G06F 8/63 709/226 |
| 8,447,728 | B2 | 5/2013 | Prahlad et al. | |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Matthew J Ellis
(74) *Attorney, Agent, or Firm* — Foley & Lardner LLP

(57) ABSTRACT

A system and method include reconfiguring original configuration parameters of virtual objects when restoring the virtual objects on a different node. Snapshots of virtual objects running on a first node can be stored on a second node. Upon failure of the first node, the virtual objects can be restored on the second node based on the snapshots. The snapshots can include configuration information of the virtual objects specifying the resource need of the virtual objects. The second node can determine whether the available resources meet the resource needs of the virtual objects being restored. If the resource needs of the virtual objects exceed the available resources, the second node can reconfigure the original configuration parameters of the virtual objects to ensure the virtual objects can be restored and run on the second node.

21 Claims, 8 Drawing Sheets

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,762,335 | B2 | 6/2014 | Prahlad et al. |
| 8,850,130 | B1 | 9/2014 | Aron et al. |
| 9,436,493 | B1* | 9/2016 | Thomas .............. G06F 21/6218 |
| 9,740,723 | B2* | 8/2017 | Prahlad .............. G06F 11/1458 |
| 9,772,866 | B1 | 9/2017 | Aron et al. |
| 10,210,048 | B2* | 2/2019 | Sancheti ............. G06F 11/1458 |
| 10,248,657 | B2 | 4/2019 | Prahlad et al. |
| 2010/0064055 | A1* | 3/2010 | Krikorian ........ H04N 21/44004 709/231 |
| 2014/0289566 | A1 | 9/2014 | Timashev et al. |
| 2017/0344618 | A1* | 11/2017 | Horowitz ............ G06F 11/2097 |
| 2018/0032362 | A1* | 2/2018 | Buil ........................ H04L 67/10 |
| 2018/0121222 | A1* | 5/2018 | Sharma ................. G06F 9/5077 |
| 2018/0181436 | A1* | 6/2018 | Chen ...................... G06F 9/461 |
| 2019/0173803 | A1* | 6/2019 | Singh ................. H04L 43/0876 |
| 2020/0073552 | A1* | 3/2020 | Sangle ................. G06F 3/0619 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

VO configuration 300

| Parameters | VO1 | VO2 | VO3 |
|---|---|---|---|
| No. of vCPUs | 4 | 8 | 8 |
| No. of vRAMs | 4 | 4 | 8 |
| No. of vNICs | 2 | 1 | 4 |
| Amount of Storage | 1 TB | 2 TB | 4 TB |
| Network Parameters<br>    IP address<br>    Gateway address<br><br>Policies<br>    Protection Policy<br>    Affinity Policy<br>    Micro-segmentation Policy<br>    Storage Policy<br>    Security Policy | | | |

FIG. 3

VO Performance Parameters

| Parameters | VO1 | VO2 | VO3 |
|---|---|---|---|
| vCPU utilization | 10% | 35% | 75% |
| vRAM utilization | 75% | 20% | 50% |
| vNIC utilization | 65% | 10% | 90% |

FIG. 4

Available Resources

| Resource | Number available |
|---|---|
| vCPUs | 16 |
| vRAMs | 32 |
| vNICs | 32 |

FIG. 7

Reconfigured configuration parameters 800

| Parameters | VO1 | VO2 | VOn |
|---|---|---|---|
| No. of vCPUs | 1 | 3 | 6 |
| No. of vRAMs | 4 | 4 | 8 |
| No. of vNICs | 2 | 1 | 4 |
| Amount of Storage | 1 TB | 2 TB | 4 TB |
| Network Parameters<br>    IP address<br>    Gateway address | | | |
| Policies<br>    Protection Policy<br>    Affinity Policy<br>    Micro-segmentation Policy<br>    Storage Policy<br>    Security Policy | | | |

FIG. 8

SYSTEM AND METHOD FOR RECONFIGURING CONFIGURATION PARAMETERS OF VIRTUAL OBJECTS DURING RECOVERY

BACKGROUND

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, the virtual machines may be migrated from one host machine to another host machine. Typically, such migration occurs when the virtual machine is not in use. In some instances, live migration of a virtual machine that is in use is done by copying data stored in memory to the second host machine incrementally until a final data copy can be performed.

SUMMARY

In accordance with at least some aspects of the present disclosure, a method is disclosed. The method includes receiving, at a second node, from a first node over a computer network, at least one snapshot of a virtual object running on the first node. The method further includes receiving, at the second node, an indication to restore the virtual object at the second node. The method also includes determining, at the second node, original configuration parameters associated with the virtual object from the at least one snapshot of the virtual object, and determining, at the second node based on the original configuration parameters, resource needs of the virtual object, the resource needs based on at least one of a virtual processor, a virtual memory, or a virtual network interface specified for the virtual object. The method also includes determining, at the second node, that available resources at the second node are insufficient to meet resource needs of the virtual object, and reconfiguring, at the second node, the original configuration parameters of the virtual object to generate reconfigured configuration parameters of the virtual object such that the available resources at the second node meet the resource needs of the virtual object. The method also includes restoring, at the second node, the virtual object from the at least one snapshot based on the reconfigured configuration parameters.

In some embodiments, the method also includes comparing at least one parameter from the original configuration parameters with a corresponding at least one available resource, and determining, based on the comparing, that resources at the second node are insufficient to meet resource needs of the virtual object. In some embodiments, the method also includes determining, at the second node, at least one performance parameter of the virtual object from the at least one snapshot, and reconfiguring, at the second node, the original configuration parameters of the virtual object to generate the reconfigured configuration parameters based at least on the at least one performance parameter of the virtual object. In some embodiments, the method further includes determining, at the second node, a lower resource limit for the virtual object from the at least one snapshot, and reconfiguring, at the second node, the original configuration parameters of the virtual object to generate the reconfigured configuration parameters based at least on the lower resource limit. In some embodiments, the method also includes allocating, at the second node, resources at the second node to the virtual object based on the reconfigured configuration parameters.

In some embodiments, the method further includes maintaining, at the second node, in the reconfigured configuration parameters a value of at least one configuration parameter from the original configuration parameters. In some embodiments, the method also includes maintaining, at the second node, in the reconfigured configuration value of a network related configuration parameter. In some embodiments, the method further includes determining, at the second node, that resources at the second node are insufficient to meet resource needs of the virtual object based on resource needs of at least one another virtual object having a corresponding snapshot stored at the second node. In some embodiments, the method also includes reconfiguring, at the second node, the original configuration parameters of the virtual object as well as original configuration parameters of the at least one another virtual object such that the available resources meet combined resource needs of the virtual object and the at least one another virtual object. In some embodiments, the method further includes storing, at the second node, memory data from the at least one snapshot to a physical memory at the second node, and mapping, at the second node, the physical memory to the virtual memory allocated to the virtual object.

In accordance with another aspect of the present disclosure, a system is disclosed. The system includes a first node including a virtual object, and a second node, communicably coupled to the first node over a computer network. The second node includes a storage device having at least one snapshot of the virtual object stored therein, and a controller coupled to the storage device. The controller is configured to receive an indication to restore the virtual object at the second node. The controller is further configured to determine from the at least one snapshot of the virtual object original configuration parameters associated with the virtual object, and determine based on the original configuration parameters, resource needs of the virtual object, the resource needs based on at least one of a virtual processor, a virtual memory, or a virtual network interface specified for the virtual object. The controller is further configured to determine that available resources at the second node are insufficient to meet resource needs of the virtual object, and reconfigure the original configuration parameters of the virtual object to generate reconfigured configuration parameters of the virtual object such that the available resources at the second node meet the resource needs of the virtual object. The controller is also configured to restore the virtual object from the at least one snapshot based on the reconfigured configuration parameters.

In some embodiments, the controller is further configured to compare at least one parameter from the original configuration parameters with a corresponding at least one available resource, and determine, based on the comparison, that resources at the second node are insufficient to meet resource needs of the virtual object. In some embodiments, the controller is also configured to determine at least one performance parameter of the virtual object from the at least one snapshot, and reconfigure the original configuration parameters of the virtual object to generate the reconfigured configuration parameters based at least on the at least one performance parameter of the virtual object. In some embodiments, the controller is also configured to determine a lower resource limit for the virtual object from the at least one snapshot, and reconfigure the original configuration parameters of the virtual object to generate the reconfigured configuration parameters based at least on the lower resource limit.

In some embodiments, the controller is further configured to allocate resources at the second node to the virtual object based on the reconfigured configuration parameters. In some embodiments, the controller is also configured to maintain in the reconfigured configuration parameters a value of at least one configuration parameter from the original configuration parameters. In some embodiments, the controller is further configured to maintain in the reconfigured configuration parameters a value of a network related configuration parameter. In some embodiments, the controller is also configured to determine that resources at the second node are insufficient to meet resource needs of the virtual object based on resource needs of at least one another virtual object having a corresponding snapshot stored at the second node. In some embodiments, the controller is further configured to reconfigure the original configuration parameters of the virtual object as well as original configuration parameters of the at least one another virtual object such that the available resources meet combined resource needs of the virtual object and the at least one another virtual object. In some embodiments, the controller is also configured to store memory data from the at least one snapshot to a physical memory at the second node, and map the physical memory to the virtual memory allocated to the virtual object.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 3 shows example configuration parameters for one or more virtual objects, in accordance with some embodiments of the present disclosure.

FIG. 4 shows example performance parameters of the virtual objects running on a first node shown in FIG. 2, in accordance with some embodiments of the present disclosure.

FIG. 7 shows an example of available resources at the second node shown in FIG. 5, in accordance with some embodiments of the present disclosure.

FIG. 8 shows example reconfigured configuration parameters, in accordance with some embodiments of the present disclosure.

Figure 1:
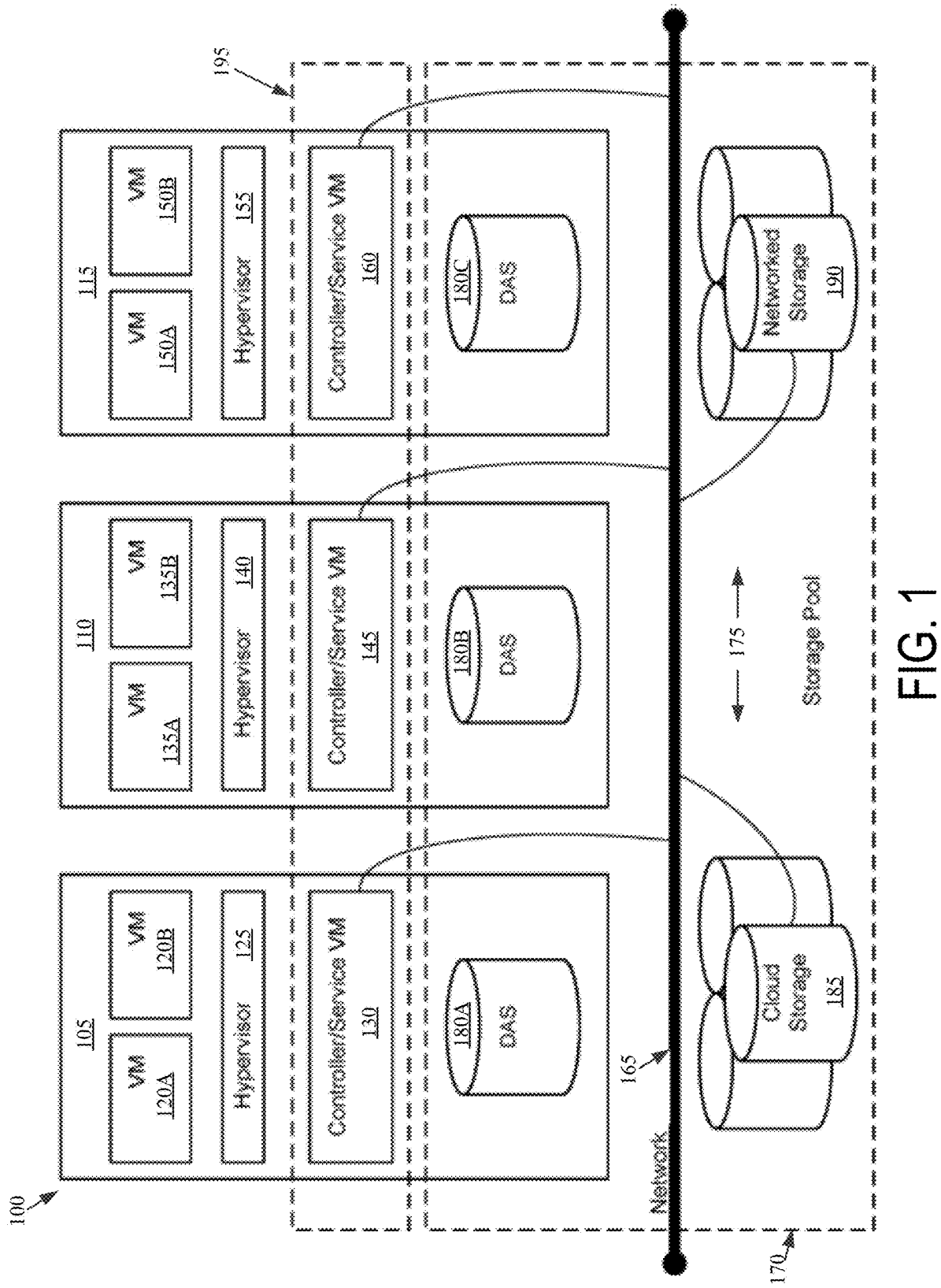
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to backup and restore of virtual objects, such as virtual machines (VMs), virtual disks, applications including a group of VMs, and the like. These virtual objects can be run or executed on a node or cluster. For example, a node can include a hypervisor that can run a number of virtual objects and provide hardware and memory resources to the virtual objects. The virtual objects can emulate the functionality of a physical computer and may run their own operating system and applications on underlying physical resources virtualized by the hypervisor. In some implementations, the virtual objects may be run on a cloud platform. Due to hardware or software failure at the node or cluster, the virtual objects may be lost. To reduce the risk of such loss, the virtual objects can be backed up at a second node so that they can be restored in case of a data loss event. When a first node or cluster, where the virtual objects are currently running goes down, a restoration of the virtual objects on the second node or cluster, where the virtual objects are backed up, can be initiated. The second host machine can include data associated with the virtual objects. For example, the data can include memory and configuration of the virtual objects.

One technical problem associated with migrating the virtual objects from the first node to the second node is that the second node may not meet the configuration desired by the virtual objects. For example, the virtual objects, when running on the first node, may be assigned a certain number of processors, a certain size of memory, a certain number of network interfaces, and other resources by a hypervisor at the first node. But the second node may not be able to accommodate resources needed by the virtual object. For example, the second node may be configured to have fewer resources than the first node. As a result, one or more virtual objects may not be provided with the desired resources available on the second node that were otherwise available on the first node. Without the available resources, the virtual object may be prevented from being restored on the second node, resulting in undesired downtime of the virtual object and interruption in services provided by the virtual object. In some examples, the second node may be resized such that the resources available in the second node match or exceed those available to the virtual objects on the first node, when the first node is operational. Thus, when the virtual objects are restored on the second node, the desired resources can be made available to the virtual objects. But increasing the resources at the second node, which is otherwise generally used for storing snapshots of the virtual objects, may result in overprovisioning of the second node, and thereby result in underutilized resources during the time that the first node is operational. This can increase the cost associated with the operation of the second node.

The discussion below provides at least one solution to the technical problems discussed above. For example, the virtual objects can be reconfigured before restoration at the second node based on the available resources at the second node. In addition, the virtual object can be reconfigured based on the configuration of other virtual objects that are to be migrated and restored on the second node. The second node can compare the available resources on the second node to those listed in an original configuration associated with a virtual object. The second node can reconfigure the virtual object such that the resources allocated are different from those specified in the virtual object's original configuration. The second node can reconfigure the virtual object at least to the extent that the virtual object can be run on the second node, albeit with reduced resources. Thus, the virtual object is not prevented from being run on the second node altogether. As a result, the virtual object can be migrated to the second node with reduced risk of unavailability.

During backup, the first node can take snapshots of the virtual object and store the snapshots at the second node. The snapshots can include data in the memory and data in storage related to the virtual object. The snapshot can also include the configuration data associated with the virtual object. The configuration data, as mentioned above, can include information regarding the resources at the first node assigned to the virtual object. For example, the configuration data can include a number of processors, a number of memory units, a number of network interfaces, configuration of the network interfaces, and the like, that have been assigned to the virtual object. In restoring the virtual object at the second node, the second node can not only restore the data associated with the virtual object from the stored snapshot, but also examine the original configuration of the virtual object. As discussed above, the second node can reconfigure the virtual object based on the available resources at the second node to ensure availability of the virtual object on the second node, thereby improving system performance. In addition, the delay in restoring the virtual object at the second node can be reduced.

Referring now to FIG. 1, a virtual computing system 100 is shown, in accordance with some embodiments of the present disclosure. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, respectively, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc., for running the user VMs 120, the user VMs 135, and the user VMs 150, respectively, and for managing the interactions between the user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. The leader node may also be configured to receive and handle requests (e.g., user requests) from outside of the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Further, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, and the controller/service VM 160 for controlling the various clusters.

Again, it is to be understood again that only certain components of the virtual computing system 100 are shown and described herein. Nevertheless, other components that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
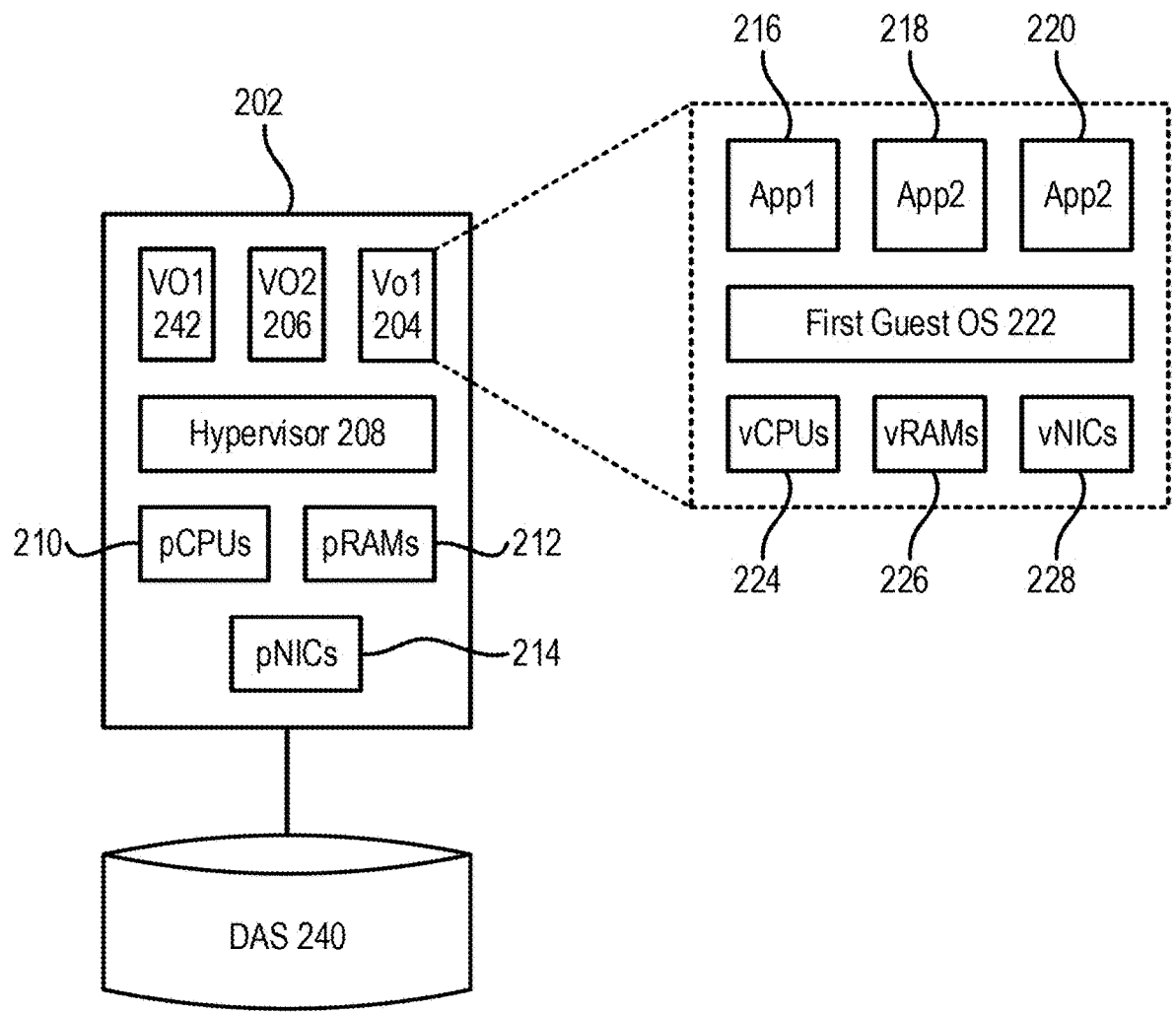
FIG. 2 depicts a block diagram of another virtual computing system, in accordance with some embodiments of the present disclosure.

Turning to FIG. 2, a virtual computing system 200 is shown, in accordance with some embodiments of the present disclosure. In particular, FIG. 2 illustrates details of a first node 202 including a first virtual object 204 and a second virtual object 206 and a third virtual object 242. The first node 202 further includes a first hypervisor 208, a first set of physical central processing units (pCPUs) 210, a first set of physical random access memories (pRAMs) 212, and a first set of physical network interface cards (pNICs) 214. The first node 202 is also communicably connected to a direct-access storage (DAS) 240. The first virtual object 204, the second virtual object 206, and the third virtual object 244, can include any virtual entities supported by the first hypervisor 208. For example, the first, second, and third virtual objects 204, 206, and 242 can include virtual machines, virtual applications including a group of virtual machines, virtual storage, and the like. Virtual applications can include virtual systems that employ multiple virtual machines to implement various portions of the virtual system. For example, a virtual application such as a web application can implement a web front end on one virtual machine, and a web back end on another virtual machine. In some instances, the first, the second, and the third virtual objects 204, 206, and 242 can include the user VMs 120A and 120B discussed above in relation to FIG. 1.

The first hypervisor 208 can be a computer software, firmware, or hardware that runs the first the second, and the third virtual objects 204, 206, and 242 on the first node 202. The first hypervisor 208 can present the first, second, and third virtual objects 204, 206, and 242 with a virtual operating platform and manage the execution of their respective operating systems. In some examples, the first hypervisor 208 can be similar to the hypervisor 125 discussed above in relation to FIG. 1. The first hypervisor 208 can virtualize hardware resources available at the first node 202, and present the virtualized hardware resources to the first the second, and the third virtual objects 204, 206, and 242. For example, the first virtual object 204 can include a first guest operating system 222 on which a set of programs or applications such as a first application 216, a second application 218 and a third application 220 can be running. The first hypervisor 208 can present the first guest operating system 222 with virtualized hardware resources in the form of a first set of virtual CPUs 224, a first set of virtual RAMs (vRAMs) 226, and a first set of virtual NICs (vNICs) 228. The first hypervisor 208 can map the virtual hardware resources to the physical hardware resources of the first node 202. For example, the first hypervisor 208 can map the first set of vCPUs 224 to the first set of pCPUs 210, the first set of vRAMs 226 to the first set of pRAMs 212, and the first set of vNICs 228 to the first set of pNICs 214. While not shown in FIG. 2, the first hypervisor 208 can also present virtualized hardware resources to the operating systems of the second virtual object 206 and the third virtual object 242.

Data related to the first, second, and third virtual objects 204, 206, and 242 can be stored in the DAS 240. In some instances, the data may also be stored on a cloud platform in addition, or instead of, storing in the DAS 240. The first hypervisor 208 can present a virtualized storage disk space to each of the first, second, and third virtual objects 204, 206, and 242, and appropriately map the virtualized storage disk spaces to the DAS 240. While not shown in FIG. 2, the first node 202 may also include a controller VM, such as the controller VM 130 shown in FIG. 1.

FIG. 3 shows example original configuration parameters for one or more virtual objects. In particular, FIG. 3 shows original configurations parameters of all the virtual objects supported by the first hypervisor 208 of the first node 202 shown in FIG. 2. The original configuration parameters (also referred to as "original configuration information") 300 include several configuration parameters the values corresponding to each of the virtual objects. For example, the configuration includes configuration parameters such as No. of vCPUs, No. of vRAMs, No. of vNICs, Network parameters such as IP address, and Gateway address, and Policy information such as Protection Policy, Affinity Policy, Micro-segmentation Policy, Storage Policy, Security Policy. It should be noted that the configuration 300 shown in FIG. 3 includes only an example set of parameters, and that actual implementations may include more, less, or different parameters than the ones shown in FIG. 3. The No. of vCPUs specifies the number of virtual CPUs allocated to the virtual objects. For example, in some instances, the first hypervisor 208 can allocate four vCPUs to the first virtual object 204, eight vCPUs to the second virtual object 206, and eight vCPUs to the third virtual object 242 shown in FIG. 2. The No. of vRAMs and the No. of vNICs specifies the number of virtual RAMs and the number of virtual NICs, respectively, allocated to the virtual objects. For example, the first hypervisor 208 can allocate four vRAMs and two vNICs to the first virtual object 204, four vRAMs and one vNIC to the second virtual object 206, and allocate eight vRAMs and four vNICs to the third virtual object 242. The Amount of Storage indicates the disk space allocated to the virtual objects. For example, the first hypervisor 208 may allocate 1 TB of the DAS 240 to the first virtual object 204, 2 TB to the second virtual object 206, and 4 TB to the third virtual object 242.

The Network Parameters such as the IP address and the Gateway address can specify, for example, the static IP address and the gateway address assigned to the vNIC of the virtual objects. The Network Parameters can include additional parameters such as public or external facing IP addresses. The configuration 300 can also include Policy information associated with the virtual objects. For example, Protection Policy can indicate the backup policy for the virtual object. For example, the Protection Policy may indicate that a snapshot of the virtual object, along with the configuration information related to the virtual object is stored in a remote node every hour. The Affinity Policy can indicate the how the virtual objects may be run in relation to each other. For example, the Affinity Policy can specify the virtual objects that need to run together, or the virtual objects that may not be started at the same time, etc. Micro-segmentation Policy can specify security boundaries between virtual objects. The Storage Policy can specify the parameters for de-duplication, erasure coding, storage throughput tuning (e.g., solid state drive (SSD) pinning of virtual object data). The Security Policy can be specified by the micro-segmentation policy or can include additional rules for restricting access to or from one or more virtual objects.

In some examples, the configuration information 300 can include range of values for the parameters. For example, the No. of vCPUs can indicate a lower limit to the number of vCPUs that can be allocated to a particular virtual object. For example, the second virtual object 206 may need at least four vCPUs to accomplish its tasks. Allocating vCPUs below this threshold value of four may result in unacceptable performance of the second virtual object 206. Similarly, the configuration information 300 can include ranges, or a lower limit, for the No. of vRAMs, the No. of NICs, and other parameters. The first hypervisor 208 may allocate the virtual objects at least the amount of resources that are specified in the configuration information 300. In some examples, the configuration information 300 can include one or more scaling factors associated with the parameters. For example, the configuration information 300 can include a CPU scaling factor that can indicate the factor by which the No. of vCPUs can be scaled down and allocated to the virtual object for the virtual object to still provide acceptable performance. For example, the configuration information 300 can include a CPU scaling factor of about 0.5 for the first virtual object (VO1). Thus, the No. of CPUs that the first virtual object could potentially be assigned 0.5×4=2 vCPUs without degrading the performance to unacceptable levels. The configuration information 300 can include similar scaling factors for the vRAMs, the vNICs and the amount of storage for each of the virtual objects.

In some examples, the first hypervisor 208 can also determine and store performance parameters of the virtual objects running on the first node 202. For example, FIG. 4 shows example performance parameters 400 of the virtual objects running on the first node 202 shown in FIG. 2, in accordance with some embodiments of the present disclosure. The performance parameters 400 can include parameters such as, for example, vCPU utilization, vRAM utilization, and vNIC utilization. The performance parameters can indicate the utilization of allocated resources to the virtual object. For example, the vCPU utilization can indicate a percentage usage of the total number of vCPUs allocated to the virtual object. Similarly, the vRAM utilization and the vNIC utilization can indicate a percentage usage of the total number of the vRAMs and the vNICs, respectively, allocated to the virtual object. The performance parameters can be measured by the first hypervisor 208 over a specific time period. For example, the first hypervisor 208 can measure the resource usage of each virtual object over a moving time window. The duration of the time window can be, for example, between about one minute and about one day. As an example, the virtual object performance parameters 400 indicate that the first virtual object (VO1) 204 utilizes 10% of its allocated vCPUs. Referring again to FIG. 3, the original configuration parameters 300 indicate that the first virtual object (VO1) 206 is allocated 4 vCPUs. However, as indicated by the performance parameters 400 shown in FIG. 4, the first virtual object 204 utilizes only 10% of the allocated vCPU resources. The performance parameters 400 indicate that the first virtual object (VO1) 204 utilizes 75% of its allocated vRAM, and utilizes 65% of its allocated vNICs; the second virtual object (VO2) 206 utilizes 35%, 20%, and 10% of its allocated vCPUs, vRAMs, and vNICs, respectively; and the third virtual object (VO3) utilizes 75%, 50%, and 90% of its allocated vCPUs, vRAMs, and vNICs, respectively.

Figure 5:
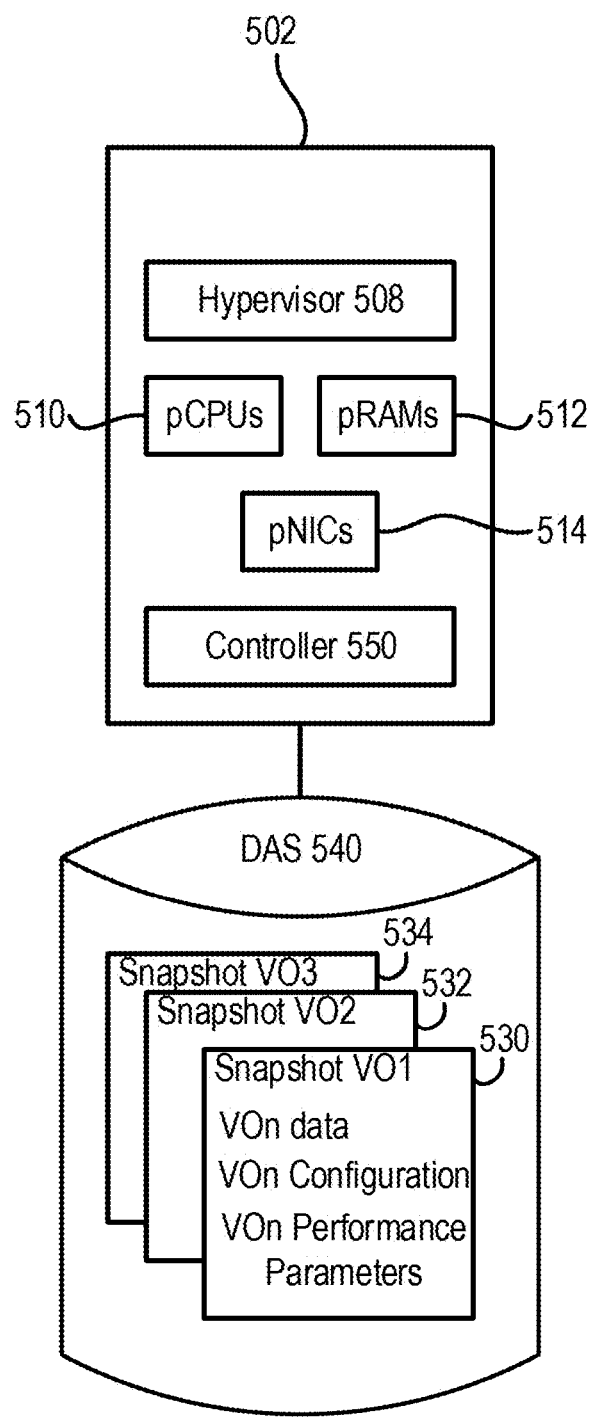
FIG. 5 shows a block diagram of a second node for storing snapshots of the virtual objects running on the first node shown in FIG. 2, in accordance with some embodiments of the present disclosure.

FIG. 5 shows a block diagram of a second node 502 for storing snapshots of the virtual objects running on the first node shown in FIG. 2. The second node 502 can be similar to the node 110 discussed above in relation to FIG. 1. The second node 502 can communicate with the first node 202 shown in FIG. 2 via a network (such as the network 165 shown in FIG. 1). The second node can include a second hypervisor 508, a second set of pCPUs 510, a second set of pRAMs 512, and a second set of pNICs 514. While not shown in FIG. 5, the second hypervisor 508 can support one or more virtual objects running on the second node 502. The second node 502 can be used to restore virtual objects that were previously running on another node, such as the first node 202 shown in FIG. 2, when that node encounters a failure event that impacts the execution of the virtual objects. The failure events can include power failure, network failure, disk failure, physical memory failure, physical processor failure, etc.

Further, the second node 502 can include a controller virtual machine 550 (such as the controller virtual machine 130 shown in FIG. 1). The controller virtual machine 550 can communicate with a corresponding controller in the first node 202 to receive snapshots of the virtual objects running on the first node 202. The controller 550 can store the received snapshots in the direct access storage 540. For example, as shown in FIG. 5, the direct access storage 540 includes a first snapshot 530 of the first virtual object 204, a second snapshot 532 of the second virtual object 206, and a third snapshot 534 of the third virtual object 242 of the first node 202 shown in FIG. 2.

Each snapshot can include the state and data related to the corresponding virtual object. For example, the first snapshot 530 corresponding to the first virtual object 204 can include VO1 state and data, which can include memory as well as storage data associated with the first virtual object (VO1) 204. The first snapshot 530 can include a state of the first virtual object 204 at the time the first snapshot 530 was taken. For example, the state of the first virtual object 204 could be a powered-on state, a powered-off state, or a suspended state. The data of the first virtual object 204 can include contents of the memory of the first virtual object 204, settings of the first virtual object 204, and state of the virtual disks of the first virtual object 204. The first snapshot 530 can also include VO1 original configuration parameters, which can include configuration data associated with the first virtual object 204. As an example, the first snapshot can include the original configuration parameters listed in the original configuration information 300 shown in FIG. 3, and the corresponding values for the first virtual object 204. The original configuration parameters can specify the resource allocation of the first virtual object 204 at the first node 202. The first snapshot 530 can further include performance parameters corresponding to the first virtual object 204. For example, the performance parameters can include the performance parameters 400 discussed above in relation to FIG. 4. The second node 502 can receive the snapshots over a period of time based, for example, on the protection policies of the virtual objects running on the first node 202. As an example, a snapshot may be received every hour, or every day, or every week. In some instances, the controller 550 can replace any previous snapshot of the same virtual object with the latest snapshot. In some instances, the controller 550 can store more than one snapshot corresponding to the same virtual object.

The first, second, and third snapshots 530, 532, and 534 can be used by the second node 502 to restore the corresponding virtual objects at the second node 502. For example, during restoration, the controller 550 can instruct the second hypervisor 508 to restore the first, second, and third virtual objects 204, 206, and 242 from their corresponding snapshots stored in the direct access storage 540. In instances were the second node 502 is configured to have or exceed the resources of the first node 202, the restoration of the virtual objects 204, 206, and 242 on the second node can be straight forward. However, the second node 502 may have fewer resources than the first node 202. For example, the second set of pCPUs 510 may be fewer or of lower performance than the first set of pCPUs 210. Similarly, the second set of pRAMs 512 may be fewer than or of a smaller size than the first set of pRAMs 212, and the second set of pNICs 514 may be fewer than or of lower performance than the first set of pNICs 214. The second node 502 having fewer resources than the first node 202 may not be surprising, as the second node 502 may be used primarily to store the snapshots of the virtual objects, and to restore the virtual objects in cases where the first node 202 experiences a failure. Typically, the second node 502 may have to run the restored virtual objects only until the first node 202 is operational again, and the virtual objects can again be run on the first node 202. In some instances, the second node 502 can refrain from restoring a virtual object if the available resources at the second node 502 are insufficient to meet the resource needs of the virtual object. However, this may cause disruption in the availability of the virtual object, which may lead to negative performance impact on the system.

To reduce the risk of the non-availability of the virtual object due to resource insufficiency at the second node 502, the virtual object can instead be run on the second node 502 despite insufficient resources. The virtual object can be reconfigured such that the virtual object can at least be run on the second node 502, albeit with reduced performance. The loss in performance of the virtual object may outweigh the benefits of keeping the virtual object available.

Figure 6:
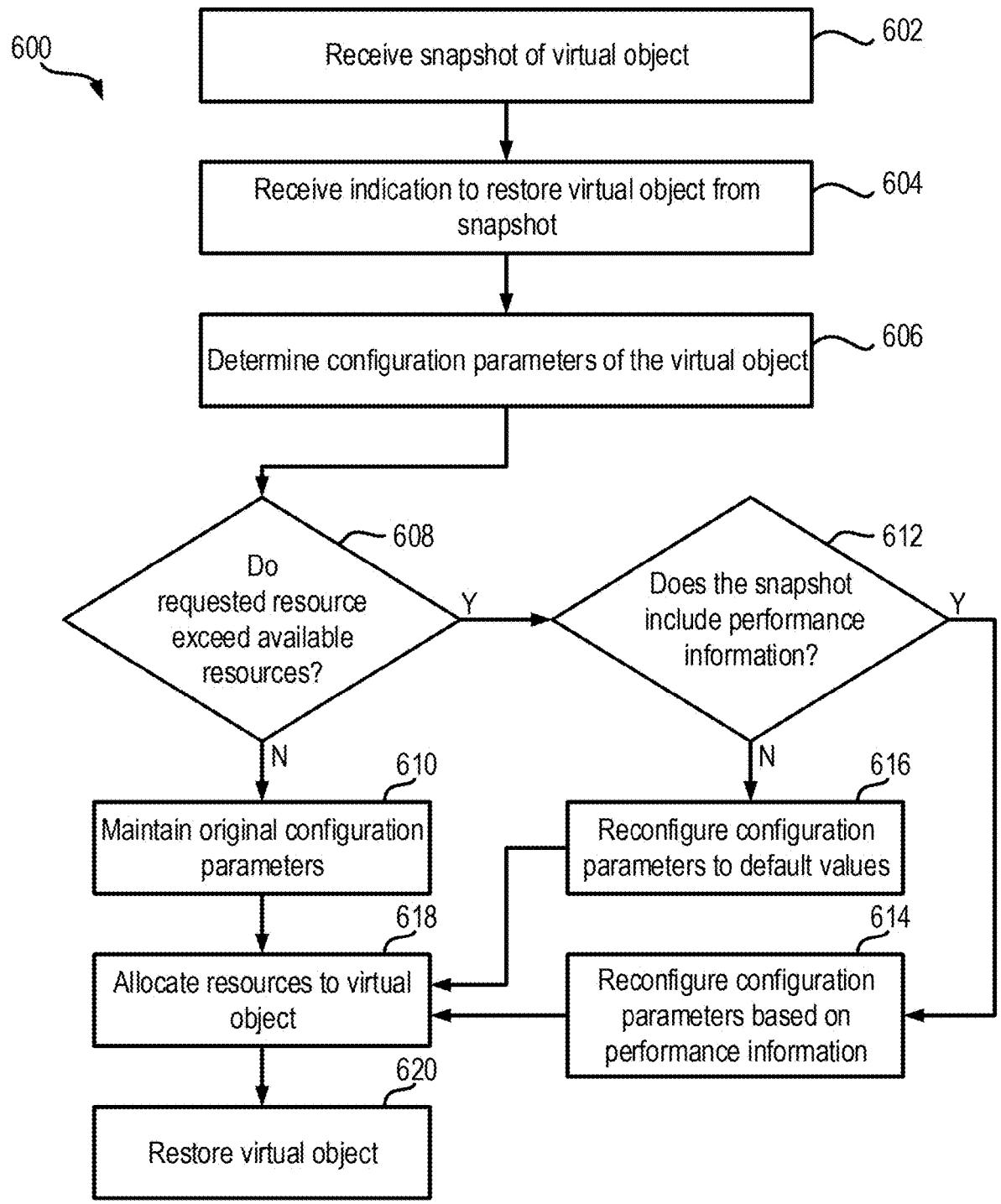
FIG. 6 illustrates a flow diagram of a process for restoring virtual objects at a second node shown in FIG. 5, in accordance with some embodiments of the present disclosure.

FIG. 6 illustrates a flow diagram of a process 600 for restoring virtual objects at the second node. The process 600 may include additional, fewer, or different operations, depending on the particular embodiment. The process 600 includes receiving a snapshot of a virtual object (602). Referring to FIG. 5, the second node 502 can receive from the first node 202 (FIG. 2) and store a first snapshot 530 for the first virtual object 204, a second snapshot 532 for the second virtual object 206, and a third snapshot 534 of the third virtual object 242. In some examples, the second node 502 may receive and store snapshots of additional or fewer virtual objects running at the first node 202. In some examples, the second node 502 can receive and store snapshots of virtual objects running at nodes other than the first node 202. Each snapshot can include the state and data related to the corresponding virtual object at the time the snapshot was taken. For example, the direct access storage 540 of the second node 502 can store a first snapshot 530, a second snapshot 532 and a third snapshot 534 of the first virtual object 204, the second virtual object 206, and the third virtual object 242 running on the first node 202.

The process 600 further includes receiving an indication to restore the virtual object at the second node (604). Referring to FIG. 5, the second node 502 may receive an indication that the one or more virtual objects for which snapshots are stored in the direct access storage 540 may have to be restored. For example, a system administrator may provide the indication to restore via a user interface associated with the second hypervisor 508. In some instances, the second hypervisor 508 may receive the indication to restore remotely via a network, such as the network 165 shown in FIG. 1. The indication may be received from another computer system monitoring the first node 202.

The process 600 also includes determining configuration parameters of the virtual object to be restored (606). The second node 502, for example, can access the first snapshot 530 of the first virtual object 204 to determine the original configuration parameters. One example of the original configuration is shown in FIG. 3; where the first snapshot 530 can store the first virtual object 204 configuration parameters and the corresponding values for the first virtual object 204. The second node 502 can, similarly, determine the original configuration parameters and the corresponding values associated with each of the other virtual objects, such as the second virtual object 206 and the third virtual object 242. In some instances, the snapshots can be data compressed on the DAS 540. In some such instances, the second hypervisor 508 can decompress the snapshots and determine the original configuration parameters and their corresponding values for each of the virtual objects indicated for restoration.

The process 600 also includes determining whether the requested resources of the virtual objects to be restored exceed available resources at the second node (608). FIG. 7 shows an example of available resources at the second node 502. In particular FIG. 7 shows a list of available resources 700 at the second node 502. The list of available resources 700 can include, for example, a number of vCPUs, a number of vRAMs, and a number of vNICs. While not shown in FIG. 7, the list of available resources 700 may also include additional resources such as size of the vRAMs, parameters of the vCPUs, available disk space, and the like. In some examples, the second node 502 can repeatedly update the list of available resources 700 based on, for example, allocation of resources to other virtual objects running on the second node 502. The list of available resources 700 can indicate the amount of resources the second node 502 can allocate to virtual objects that may be running or are anticipated to run on the second node 502. Thus, as indicated in the list of available resources 700, the second node 502 may have 16 vCPUs available, 32 vRAMs available, and 32 vNICs available for allocation to virtual objects. In some instances, the second hypervisor 508 can store the list of available resources 700 in memory, such as the set of pRAMs 512 and/or in the direct access storage 540.

In some examples, the available resources may be expressed in terms of the number of physical resources available. For example, the available resources may include the number of pCPUs, pRAMs, and pNICs available at the second node 502. The second hypervisor 508 can determine the number vCPUs, vRAMs, and vNICs based on the corresponding physical resources and a mapping function that specifies the number of physical resources mapped to the virtual resources. For example, a mapping function may specify that one pCPU can be mapped to one vCPU. In such instances, the number of available pCPUs can correspond to the number of available vCPUs. Similar determination can be made for the available vRAMs and vNICs based on the available pRAMs and pNICs and the respective mapping functions.

The second hypervisor 508 can compare the available resources to the resources requested for the virtual objects. For example, the second hypervisor 508 can compare the available resources at the second node 502 to the requested resources as described in the original configuration parameters associated with the virtual objects of the first node 202. Referring to FIG. 3, the original configuration parameters 300 can specify the resources, such as the total number of vCPUs, vRAMs, and vNICs are needed to run the first, second and the third virtual objects 204, 206, and 242. The second hypervisor 508 can add the number of vCPUs of all the virtual objects to determine a total number of vCPUs needed. For example, referring to FIG. 3, the total number of vCPUs to run the first, the second, and the third virtual objects 204, 206, and 242 can be equal to 20. Similarly, the second hypervisor 508 can determine the total number of vRAMs to be equal to 16, and the total number of vNICs to be equal to 7. The second hypervisor 508 can compare the total number of vCPUs, vRAMs, and vNICs to the available vCPUs, vRAMs and vNICs to determine whether the requested resources exceed the available resources. Referring again to FIGS. 3 and 7, the second hypervisor 508 can determine that the total number of requested vCPUs (20) exceeds the available vCPUs (16), the total number of requested vRAMs (16) is less than the available vRAMs (32), and that the total number of requested vNICs (7) is less than the available number of vNICs (32). In a similar manner, the second hypervisor 508 can compare other requested resources (such as, for example, the amount of storage) to the corresponding available resources at the second node 502 to determine whether the requested resource exceeds the available resource at the second node 502.

The second hypervisor 508 can determine that the requested resources exceed the available resources if even one resource (such as the vCPUs) exceeds the corresponding number of available resource at the second node 502. Thus, even though the requested resources such as the vRAMs, and the vNICs do not exceed the available vRAMs and vNICs, respectively, the second hypervisor 508 can determine that the requested resources exceed the available resources at the second node 502 if only the requested number of vCPUs exceeds the available number of vCPUs at the second node 502. In some examples, the second hypervisor 508 can determine that the requested resources exceed the available resources only when two or more requested resources exceed the corresponding available resources at the second node 502. For example, the second hypervisor 508 can determine that the requested resources exceed the available resources when each of the requested vCPUs, vRAMs, and vNICs exceeds the available vCPUs, vRAMs, and vNICs, respectively, at the second node 502.

If the second hypervisor 508 determines that the number of requested resources do not exceed the available resources at the second node 502, the second hypervisor can determine to maintain the original configuration of the virtual objects (610). For example, the second hypervisor 508 can maintain the original configuration shown in FIG. 3 for restoration of the virtual objects at the second node 502. In some instances, the second hypervisor 508 may maintain only a portion of the original configuration that relates to the number of resources, while modifying other parameters. For example, the second hypervisor 508 may maintain the original configuration parameters 300 with respect to the number of vCPUs, the number of vRAMs, the number of vNICs and the amount of storage for the virtual objects, but may modify the network parameters such as the IP address of the virtual object and the gateway address.

Once the second hypervisor 508 determines that the requested resources exceed the available resources, the second hypervisor 508 may determine to reconfigure the original configuration parameters for one or more virtual objects such that the virtual objects can be run on the second node 502 despite insufficient resources. This can be advantageous in terms of maintaining high availability of the virtual objects, as opposed to electing to not run one or more virtual objects due to insufficient resources. In some examples, the second hypervisor 508 can, reconfiguring the virtual objects based on performance information received in the snapshot associated with the virtual object. In some other examples, the second hypervisor 508 can implement one or more default reconfiguration policies to reconfigure one or more virtual objects before running the virtual objects on the second node 502. In reconfiguring the virtual objects, the second hypervisor 508 can ensure that the reconfigured configuration of the virtual objects specifies resources that do not exceed the available resources at the second node.

If the second hypervisor 508 determines that the requested resources exceed the available resources, the second hypervisor 508 can further determine whether the snapshot includes performance parameters related to the virtual objects (612). As discussed above in relation to FIG. 4, the snapshot can also include performance information related to one or more virtual objects while the virtual objects were running on the first node 202. For example, the performance parameters 400 shown in FIG. 4 can indicate the utilization of the first, second, and third virtual objects 204, 206, and 242, of their respective allocated resources.

Based on the determination that the snapshot includes performance information, the second hypervisor 508 can reconfigure the configuration parameters of one or more virtual objects based on the performance information (614). For example, the second hypervisor 508 can reconfigure the configuration parameters of a virtual object based on a utilization rate of a resource allocated to that virtual object. As an example, as shown in FIG. 4, the first virtual object 204 utilizes 10% of its allocated vCPU resources. The second hypervisor 508 can reconfigure the allocation of the vCPUs to the first virtual object 204 to about 10% of the original allocation. For example, as shown in FIG. 3, the original configuration parameters 300 allocated 4 vCPUs to the first virtual object 204. The second hypervisor 508 can multiply the number 4 with 0.1, which is equal to 0.4, and round it up to the nearest or next greatest natural number, which is 1. Thus, the second hypervisor 508 can reconfigure the allocation from 4 vCPUs to 1 vCPU. Similarly, the second hypervisor 508 can reconfigure the allocation of 8 vCPUs for the second virtual object 206, and the allocation of 8 vCPUs for the third virtual object 242 to 3 vCPUs and 6 vCPUs, respectively, based on their respective utilization rates shown in FIG. 4.

The hypervisor can compare the reconfigured allocation of vCPU resources to the first, second and the third virtual object 204, 206, and 242 to the available resources. For example, the total number of requested vCPU resources after reconfiguration is equal to 10 vCPUs (1 vCPU+3 vCPUs+6 vCPUs). This is less than the available vCPU resources of 16 vCPUs. As a result, the reconfiguration results in requested resources not to exceed the available resources. The second hypervisor 508 may similarly reconfigure the allocation of other resources to the virtual objects based on the performance information of the virtual objects.

In instances where the snapshots do not include the performance information of the virtual objects, the second hypervisor 508 can reconfigure the configuration parameters based on one or more default policies (616). In one example, the second hypervisor 508 can reconfigure the original configuration by reducing the requested resources until the requested number of resources is lower than the available resources. For example, the second hypervisor 508 can reduce the number of vCPUs in the original configuration parameters 300 by the same amount or percentage for each virtual object. Thus, the second hypervisor 508 can reconfigure the configuration parameters such that the number of vCPUs allocated to each of the first, second and the third virtual objects is reduced by two, resulting in the reconfigured configuration parameter: No. of vCPUs being equal to 2, 6, and 6 for the first, second, and third virtual objects respectively. The amount or percentage by which the number of vCPUs, or for that matter any other parameter, is reduced can be based on the available resources. For example, the second hypervisor 508 can reduce the value of the configuration parameter by an amount or percentage such that the reconfigured parameters with the reduced values can be accommodated on the second node. Thus, reducing the no. of vCPUs by 2 can result in the total vCPUs requested for the virtual objects to be equal to 14, which is less than the available vCPUs (16) at the second node 502. In some instances, the original configuration parameters may include a lower limit to the resources needed by the virtual object for the virtual object to successfully run on a node. In some such examples, the second hypervisor 508 may reconfigure the original parameters such that the reconfigured parameters at least meet the lower limit needed by the virtual object.

In some instances, the second hypervisor 508 can reconfigure the original configuration parameters based on priority of the virtual objects. For example, the original configuration parameters can include an order of priority associated with the first, second and the third virtual objects 204, 206, and 242. In such instances, the second hypervisor 508 can reduce the values of the resource for the virtual object having the lowest priority first. The second hypervisor 508 can then determine whether reducing the resources for the lowest priority virtual object results in the overall requested resources to be less than or equal to the available resources. If the second hypervisor 508 determines that the total requested resources are still unmet by the available resources at the second node 502, the second hypervisor 508 can reduce the resource allocation for the virtual object with the next higher priority. After reducing the value of the resource of the virtual object with the next higher priority, the second hypervisor 508 can again determine whether the available resources at the second node 502 meet the resulting total resources. Again, if the requested resources are unmet by the available resources, the second hypervisor 508 can continue repeating the reduction in the value of the configuration parameter of the virtual objects in the reverse order of priority (lower priority to higher priority) until the total requested resources are less than or equal to the available resources at the second node 502.

The second hypervisor 508 can reconfigure the allocation of only those resources that exceed the available resources. For example, the second hypervisor 508 may only reconfigure the vCPU resources as the requested vCPU resources exceeded the available vCPU resources, and refrain from reconfiguring the vRAM and vNIC resources, as these resources did not exceed the available vRAM and vNIC resources. In some examples, the second hypervisor 508 may reconfigure all the resources even if one requested resource exceeds the corresponding available resource. Thus, for example, the second hypervisor 508 may reconfigure the vRAM and vNIC resource allocation to the virtual objects based on the requested vCPU resources exceeding the available vCPU resources, despite the fact that the requested vRAM and vNIC resources are below the available vRAM and vNIC resources.

FIG. 8 shows example reconfigured configuration parameters 800. In particular, the reconfigured configuration parameters 800 can be a result of the second hypervisor 508 reconfiguring the values of at least one configuration parameter of at least one virtual object. For example, the second hypervisor 508 can reconfigure the parameter: No. of vCPUs for the first, second, and third virtual objects 204, 206, and 242 to 1, 3, and 6 respectively. The reconfiguration, can be based on performance information of the virtual objects at the first node 202, or can be based on default policies utilized by the second hypervisor 508. The second hypervisor 508 can reconfigure the values of additional parameters such as the No. of vRAMs, the No. of vNICs, the Amount of Storage, etc., as well, based on the available resources. The reconfigured configuration parameters 800 ensure that the requested resources for running the virtual objects on the second node 502 are less than or equal to the corresponding available resources at the second node 502. This ensures that the virtual objects can be run on the second node 502, albeit with reduced resources and perhaps reduced performance. But by enabling the running of the virtual objects on the second node, the second hypervisor 508 can improve the availability of the virtual objects.

The process 600 includes allocating resources to the virtual objects (618). The second hypervisor 508 can allocate resources to the virtual objects based on the original configuration parameters (as shown in FIG. 3) if the original requested resources are met by the available resources at the second node 502. Otherwise, the second hypervisor can allocate resources to the virtual objects based on the reconfigured configuration resources (as shown in FIG. 8). In either case, the second hypervisor 508 can allocate the resources listed in the original or reconfigured configuration parameters. For example, referring to the reconfigured configuration parameters 800 shown in FIG. 8, the second hypervisor 508 can allocate one vCPU to the first virtual object 204, three vCPUs to the second virtual object 206, and six vCPUs to the third virtual object 242. Similarly, the second hypervisor 508 can allocate the listed number of vRAMs, vNICs, storage, and other resources to the respective virtual object.

The process 600 includes restoring the virtual objects (620). The second hypervisor 508 can restore the first, second and the third virtual objects 204, 206, and 242 on the second node 502 based on the configuration reconfigured configuration parameters. Restoring a virtual object can include restoring the state and the data associated with the virtual object. The state and the data associated with the virtual object can be retrieved from the snapshot of the virtual object. For example, the state of the virtual object can include a powered-on state, a powered-off state, or a suspended state. Further, the second hypervisor 508 can virtualize the physical resources, such as, for example, the pCPUs 510, the pRAMs 512, and the pNICs 514 and present them to the virtual objects as virtual resources. The second hypervisor 508 also can map one or more pCPUs 510 to the one or more vCPUs allocated to the virtual objects. For example, the second hypervisor 508 can map one pCPU from the set of pCPUs 510 to one vCPU allocated to the first virtual object 204, map three pCPUs to the three vCPUs allocated to the second virtual object 206, and map six pCPUs to the six vCPUs allocated to the third virtual object 242 according to the reconfigured configuration parameters shown in FIG. 8. The second hypervisor 508 can generate a mapping table that maps one or more pRAMs to the one or more vRAMs allocated to the virtual objects. For example, the second hypervisor 508 can map four pRAMs 512 to the four vRAMs allocated to the first virtual object 204, map four pRAMs 512 to the four vRAMs allocated to the second virtual object 206, and map eight pRAMs to the eight vRAMs allocated to the third virtual object 242. In a similar manner, the second hypervisor 508 can map the pNICs 514 to the allocated vNICs for each of the first, second, and third virtual objects, and map other physical resource to the corresponding virtual resources of the virtual objects.

The second hypervisor 508 can access the snapshot of a virtual object to determine the memory content and the storage content. For example, the second hypervisor 508 can access the memory contents associated with the first virtual object 204 and load the memory contents into the pRAMs mapped to the vRAMs allocated to the first virtual object 204. In addition, the second hypervisor 508 can update memory mapping and memory addresses of the vRAMs allocated to the first virtual object 204, such that the memory content appears to be stored in the same memory locations as stored in the first node 202. The second hypervisor 508 can similarly load the storage content associated with the first virtual object 204 onto the direct access storage 540 and update memory mapping of virtual disks allocated to the first virtual object 204 such that the storage content appears to be stored at the same locations as in the first node 202. In a similar manner, the second hypervisor can restore the memory content and the storage content of the second virtual object 206 and the third virtual object 242 such that the memory contents and the storage contents appear to be in the same locations as they were in the first node 202.

The second hypervisor 508 can restore the network parameters and the policies for the virtual objects based on the reconfigured configuration parameters. For example, the second hypervisor 508 can assign the same virtual IP addresses and gateway addresses to the vNICs of the virtual objects as that utilized in the first node 202. Further, the second hypervisor 508 can implement the various policies described in the configuration information. For example, the second hypervisor 508 can store the data described in the Affinity policy to ensure that only the virtual objects that were specified to run together are run together, or the virtual objects that were specified not to run together are not run together. Similarly, the second hypervisor 508 can store the data related to the micro-segmentation policy, the storage policy, and the security policy, and ensure that the policies are implemented in a manner similar to that at the first node 202.

The second hypervisor 508 can launch the virtual objects to the state specified by their corresponding snapshot. For example, if the first snapshot 530 indicates that the first virtual object 204 is in the powered-on state, then the second hypervisor 508 can launch the first virtual object 204 at the second node 502 in the powered-on state. Similarly, if the snapshot of a virtual object indicates that the virtual object is in the powered-off state or the suspended state, the second hypervisor 508 can launch the virtual object in that state.

Although the present disclosure has been described with respect to software applications, in other embodiments, one or more aspects of the present disclosure may be applicable to other components of the virtual computing system 100 that may be suitable for real-time monitoring by the user.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. A method comprising:
receiving, at a second node, from a first node over a computer network, a snapshot of a virtual object running on the first node;
receiving, at the second node, an indication to restore the virtual object at the second node;
determining, at the second node, original configuration parameters associated with the virtual object from the snapshot of the virtual object;
determining, at the second node based on the original configuration parameters, a resource need for the virtual object from the configuration information in the snapshot;
identifying, at the second node, the resource need from a range of values in the original configuration parameters;
determining, at the second node based on the original configuration parameters, that a corresponding available resource at the second node is insufficient to meet the resource need of the virtual object;
in response to determining that available resources at the second node are insufficient to meet the resource need of the virtual object, reconfiguring, at the second node, the original configuration parameters of the virtual object to generate reconfigured configuration parameters based at least on the resource need; and
restoring the virtual object based on the reconfigured configuration parameters.

2. The method of claim 1, further comprising:
determining, at the second node, a performance parameter of the virtual object from the snapshot;
reconfiguring, at the second node, the original configuration parameters of the virtual object to generate the reconfigured configuration parameters based at least on the performance parameter of the virtual object.

3. The method of claim 1, further comprising:
allocating, at the second node, resources at the second node to the virtual object based on the reconfigured configuration parameters.

4. The method of claim 1, further comprising:
maintaining, at the second node, in the reconfigured configuration parameters a value of a configuration parameter from the original configuration parameters.

5. The method of claim 4, further comprising:
maintaining, at the second node, in the reconfigured configuration value of a network related configuration parameter.

6. The method of claim 1, further comprising:
determining, at the second node, that resources at the second node are insufficient to meet resource needs of the virtual object based on resource needs of another virtual object having a corresponding snapshot stored at the second node.

7. The method of claim 6, further comprising:
reconfiguring, at the second node, the original configuration parameters of the virtual object as well as original configuration parameters of the another virtual object such that the available resources meet combined resource needs of the virtual object and the another virtual object.

8. The method of claim 1, further comprising:
storing, at the second node, memory data from the snapshot to a physical memory at the second node, and
mapping, at the second node, the physical memory to the virtual memory allocated to the virtual object.

9. A system having a network including a tangible storage device and a processor, the system comprising:
a first node including a virtual object; and
a second node, communicably coupled to the first node over a computer network, comprising:
a storage device having a snapshot of the virtual object stored therein, and a controller coupled to the storage device, having programmed instructions that when executed cause the controller to:
  receive an indication to restore the virtual object at the second node;
  determine from the snapshot of the virtual object original configuration parameters associated with the virtual object;
  determine based on the original configuration parameters a resource need for the virtual object from the snapshot;
  identify the resource need from a range of values in the original configuration parameters;
  determine, based on the original configuration parameters, that a corresponding available resource at the second node is insufficient to meet the resource need of the virtual object;
  in response to determining that available resources at the second node are insufficient to meet the resource need of the virtual object, reconfigure the original configuration parameters of the virtual object to generate reconfigured configuration parameters based at least on the resource need; and
  restore the virtual object based on the reconfigured configuration parameters.

10. The system of claim 9, wherein the further has programmed instructions to:
  determine a performance parameter of the virtual object from the snapshot; and
  reconfigure the original configuration parameters of the virtual object to generate the reconfigured configuration parameters based at least on the performance parameter of the virtual object.

11. The system of claim 9, wherein the controller further has programmed instructions to:
  allocate resources at the second node to the virtual object based on the reconfigured configuration parameters.

12. The system of claim 9, wherein the controller further has programmed instructions to:
  maintain in the reconfigured configuration parameters a value of a configuration parameter from the original configuration parameters.

13. The system of claim 12, further comprising maintain in the reconfigured configuration parameters a value of a network related configuration parameter.

14. The system of claim 9, wherein the controller further has programmed instructions to:
  determine that resources at the second node are insufficient to meet resource needs of the virtual object based on resource needs of another virtual object having a corresponding snapshot stored at the second node.

15. The system of claim 14, wherein the controller further has programmed instructions to:
  reconfigure the original configuration parameters of the virtual object as well as original configuration parameters of the another virtual object such that the available resources meet combined resource needs of the virtual object and the another virtual object.

16. The system of claim 9, wherein the controller further has programmed instructions to:
  store memory data from the snapshot to a physical memory at the second node, and
  map the physical memory to the virtual memory allocated to the virtual object.

17. A non-transitory computer readable media storing computer readable instructions to cause a computer to perform a process comprising:
  receiving, at a second node, from a first node over a computer network, a snapshot of a virtual object running on the first node;
  receiving, at the second node, an indication to restore the virtual object at the second node;
  determining, at the second node, original configuration parameters associated with the virtual object from the snapshot of the virtual object;
  determining, at the second node based on the original configuration parameters, a resource need for the virtual object from the snapshot;
  identifying, at the second node, the resource need from a range of values in the original configuration parameters;
  determining, based on the original configuration parameters, that a corresponding available resource at the second node is insufficient to meet the resource need of the virtual object;
  in response to determining that available resources at the second node are insufficient to meet the resource need of the virtual object, reconfiguring, at the second node, the original configuration parameters of the virtual object to generate reconfigured configuration parameters based at least on the resource need; and
  restoring the virtual object based on the reconfigured configuration parameters.

18. The non-transitory computer readable media of claim 17, further comprising:
  determining, at the second node, a performance parameter of the virtual object from the snapshot;
  reconfiguring, at the second node, the original configuration parameters of the virtual object to generate the reconfigured configuration parameters based at least on the performance parameter of the virtual object.

19. The non-transitory computer readable media of claim 17, further comprising:
  allocating, at the second node, resources at the second node to the virtual object based on the reconfigured configuration parameters.

20. The non-transitory computer readable media of claim 17, further comprising:
  maintaining, at the second node, in the reconfigured configuration parameters a value of a configuration parameter from the original configuration parameters.

21. The non-transitory computer readable media of claim 20, further comprising:
  maintaining, at the second node, in the reconfigured configuration value of a network related configuration parameter.

* * * * *